UNITED STATES PATENT OFFICE.

Z. S. DOTY, OF MADISON, WISCONSIN.

IMPROVED COMPOUND PAINT-OIL.

Specification forming part of Letters Patent No. 42,757, dated May 17, 1864.

*To all whom it may concern:*

Be it known that I, Z. S. DOTY, of the city of Madison, county of Dane, and State of Wisconsin, (late of the city of Janesville, Wisconsin,) have discovered the compounding of nine different ingredients to make an oil for painting, which I believe have never before been compounded for that purpose; and I do hereby declare that the following is a full and exact description of the ingredients and the manner of compounding the same, (and what I particularly claim as new,) and the advantages arising from it over and above other oils now in use for painting.

*Receipt and directions for making and using.*—The following is the proportion of ingredients for five gallons of oil: two quarts boiled linseed-oil, one pint of japan, one pint of alcohol, one and a half pound alum, (pulverized,) one and a quarter pound litharge, one and a quarter pound red lead, one pound rosin, (pulverized,) four ounces burnt umber, (in powder,) and four and a half gallons benzole. Put the boiled linseed-oil, japan, alum, litharge, red lead, rosin, and umber into a kettle of sufficient size—say five gallons—and submit it to a gentle heat until it boils, stirring it often. Let it boil ten minutes, unless it rises; if so, take it off sooner. Let it stand in the kettle until you put the benzole into a tub of sufficient size. Then add to it the contents of the kettle. Let it stand and settle a few minutes. Then add the alcohol. Then let it thoroughly settle, and then pour it off from the sediment, and you have five gallons of the most beautiful oil for house-painting that has ever been discovered.

The advantages claimed for this composition are: It can be afforded at about one-half the present price of linseed-oil, and it makes a much whiter, smoother coat than linseed-oil, and is harder, and is more durable against heat and wet. It strikes in and adheres to the wood with a greater tenacity, and spreads much easier and goes about one-fifth farther than linseed-oil.

What I claim as my invention, and desire to secure by Letters Patent of the United States, is—

The herein-described paint-oil, composed of the ingredients herein named, and compounded in the manner and for the purpose substantially as set forth.

Z. S. DOTY.

Witnesses:
FRANCIS MASSING,
H. L. FOSTER.